Sept. 5, 1961      G. J. NEUMANN      2,999,153
BROADBAND TRANSMIT-RECEIVE DEVICE
Filed Dec. 30, 1954      3 Sheets-Sheet 1
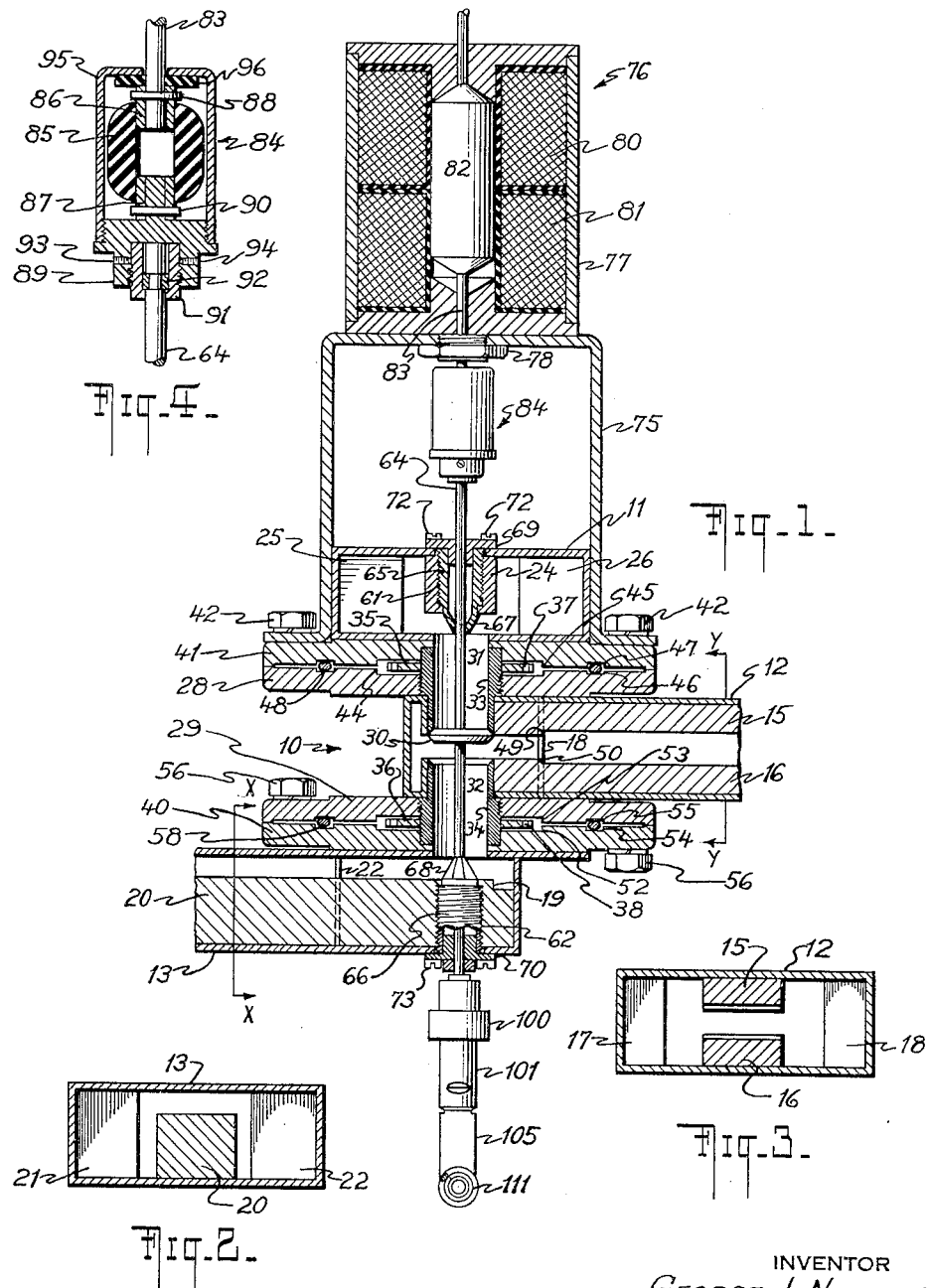
INVENTOR
GEORGE J. NEUMANN
BY
ATTORNEY

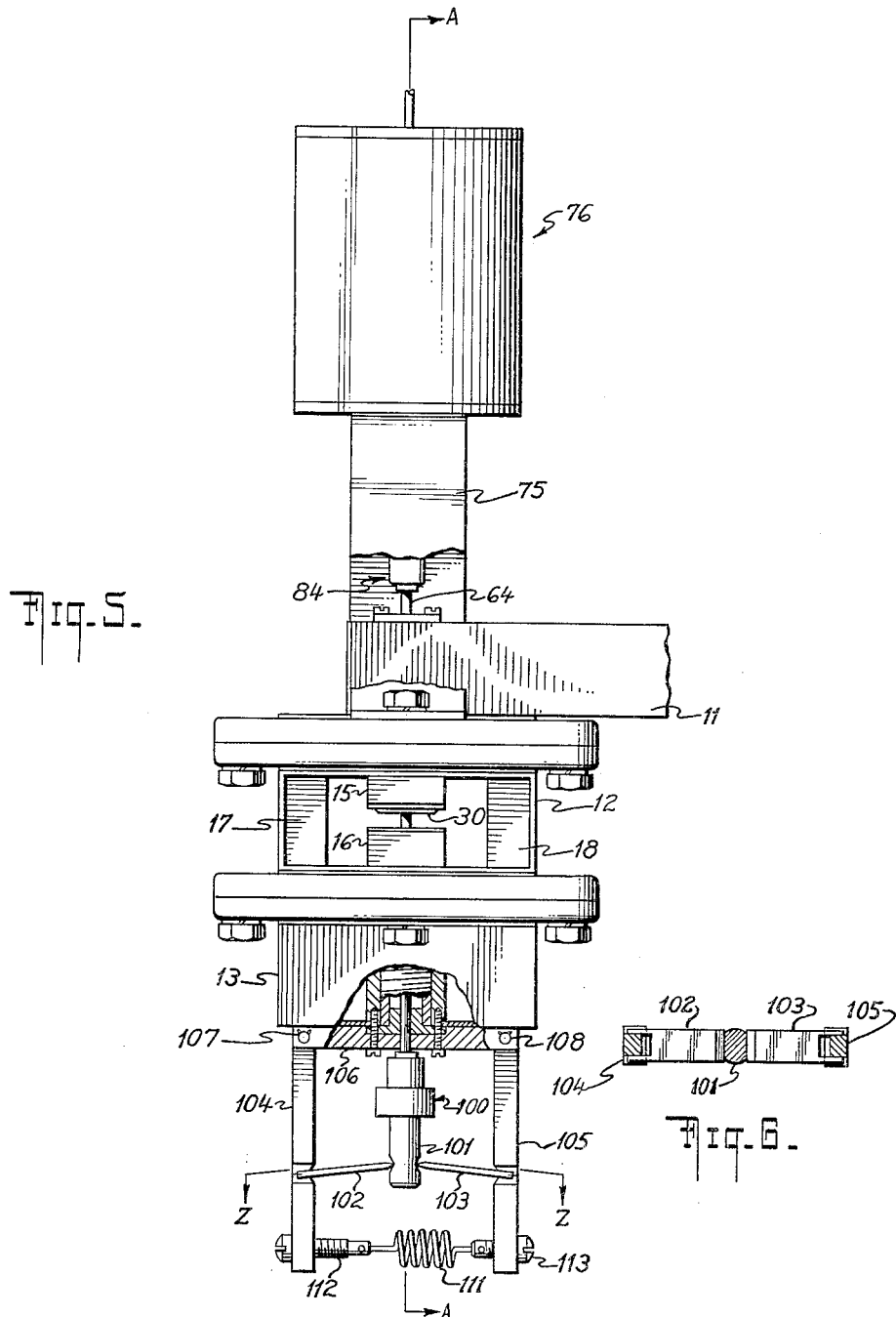

Sept. 5, 1961    G. J. NEUMANN    2,999,153
BROADBAND TRANSMIT-RECEIVE DEVICE
Filed Dec. 30, 1954    3 Sheets-Sheet 3
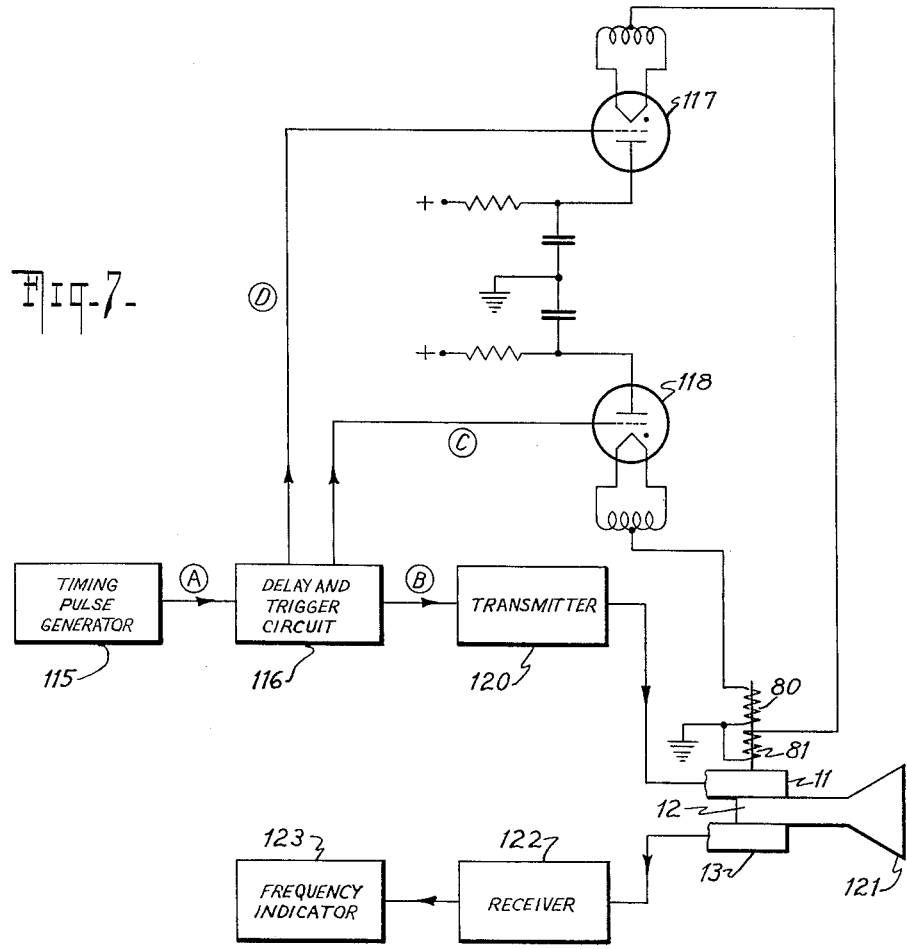
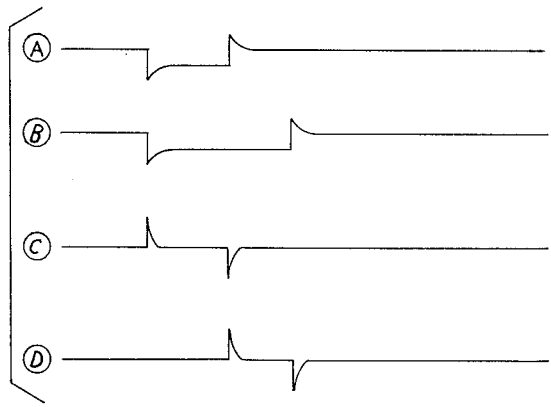
INVENTOR
GEORGE J. NEUMANN
BY
ATTORNEY

United States Patent Office 2,999,153
Patented Sept. 5, 1961

2,999,153
BROADBAND TRANSMIT-RECEIVE DEVICE
George J. Neumann, Bayside, N.Y., assignor to Sperry Rand Corporation, a corporation of Delaware
Filed Dec. 30, 1954, Ser. No. 478,803
18 Claims. (Cl. 250—13)

This invention relates to a broadband transmit-receive device and more particularly to improvements in a fast-acting, mechanical, broadband, transmit-receive device.

The patent application Serial No. 428,007, filed December 28, 1954 by, Seymour Cohn entitled Broadband Transmit-Receive Device discloses a broadband, mechanical, transmit-receive device in which a central wave guide is alternately connected to each of two other wave guides placed on either side of the central wave guide. Aligned openings connect the central wave guide to each of the other two. A shaft extending through the openings and carrying a shutter means moves longitudinally to alternately close each aperture connecting the central wave guide to the other two. The shaft constitutes the inner conductor of a coaxial line which connects the central wave guide to one of the outside wave guides while the shutter effectively closes the aperture leading to the other outside wave guide.

In such a transmit-receive device the shutter means, in its operating position, is inside the central wave guide and is larger than the apertures therein. The device should therefore be specially constructed in such a manner as to allow a practical method of inserting the shutter during assembly. Because the walls of the wave guides must be good electrical conductors for efficient operation, it is not desirable to split the wave guides indiscriminately and bolt the pieces together for ready disassembly. It is desirable to have the switching time (the transit time of the shutter from one position to another) as short as possible. Such a fast switching action places a considerable strain on the moving parts of the device and tends to produce rapid wear on the shutter and seats thereof.

It is an object of this invention to provide a broadband mechanical transmit-receive device in which the time required in switching from one channel to another is reduced to a minimum;

It is an object of this invention to provide a mechanical transmit-receive device in which the parts subject to wear are replaceable;

It is an object of this invention to provide a fast-acting mechanical transmit-receive device in which the parts subject to stress due to rapid switching action are protected against shock;

It is an object of this invention to provide a radio-transmitting and receiving system using a single antenna connected to the transmitter and receiver by transmit-receive device in which the operation of the transmit-receive device is controlled by timing pulses so that the transmitted pulses will not be applied to the receiver and so that the transmitter will not feed into a short circuit;

It is an object to construct a transmit-receive device in such a manner that it may be easily assembled and disassembled and so that the electrical efficiency of the device will not be unduly impaired.

The objects above set forth are accomplished in the invention herein disclosed by utilizing aperture inserts providing replaceable seats for the shutter means and by splitting the wave guide assembly of the transmit-receive device between each outer wave guide and the central one. An over-center spring device is provided to hold the shutter firmly in either seated position and to speed the switching action. Resilient means are provided between the driving means and the shutter to cushion against the shock of starting and stopping.

Other objects and advantages of this invention will be obvious to those skilled in the art from a consideration of the following specification taken in connection with the accompanying drawing in which, FIG. 1 is a sectional side elevation view of a transmit-receive device embodying the principles of this invention.

FIG. 2 is a cross sectional view taken along line X—X in FIG. 1.

FIG. 3 is a cross sectional view taken along Y—Y in FIG. 1.

FIG. 4 is a cross sectional view of the shock-protecting and coupling device 84.

FIG. 5 is a front elevational view of the device shown in FIG. 1.

FIG. 6 is a view taken along lines Z—Z in FIG. 5.

FIG. 7 is a block diagram, partially schematic, of a system embodying the principles of this invention.

FIG. 8 is a series of curves helpful in explaining the operation in the system shown in FIG. 7.

In the device seen in FIG. 1 there is provided a wave guide assembly 10 comprising three wave guides 11, 12 and 13, respectively, all of which are rectangular in cross section and are preferably constructed of a metal having a high electrical conductivity. The central wave guide 12 is a double ridge wave guide having impedance matching ridges 15 and 16 each of which extends from one of the broad faces of wave guide 12 as seen in FIG. 3. The entire length of ridges 15 and 16 is not shown in the drawings but ridges 15 and 16 would either taper or be stepped to an ever decreasing cross-section as they extend toward the open end of the wave guide to provide for efficient impedance matching over a broadband of frequencies. To achieve a better match, ridges 15 and 16 are provided with steps 49 and 50, respectively.

An inductive iris consisting of members 17 and 18 is provided to obtain a better match over a broadband of frequencies between the double ridge wave guide 12 and the coaxial lines connecting wave guide 12 with wave guides 11 and 13, respectively. These coaxial lines will be described more in detail below. Steps 49 and 50 are in alignment, transversely of wave guide 12, with iris 17—18.

Wave guide 13 is a single ridge wave guide having one ridge 20 fixed to the broad face of wave guide 13 which is most remote from the central wave guide 12. Ridge 20 has a notch 19 running transversely of its length at the end wall of wave guide 13. The entire length of ridge 20 is not shown but it too would be tapered or stepped in the manner described for ridges 15 and 16.

Wave guide 13 also has an inductive iris consisting of members 21 and 22 to aid in obtaining a better match over a broadband of frequencies between the single ridge wave guide 13 and the coaxial line connecting wave guides 12 and 13.

Wave guide 11 has a single matching ridge 24 extending from its broad face most remote from the central wave guide 12. The matching ridge 24 in wave guide 11 and the iris 25—26 corresponds in all respects to the ridge 20 and iris 21—22 in wave guide 13.

Wave guides 11, 12 and 13 terminate in flanges, not shown, for coupling to similar flanges of connecting wave guides. These connecting wave guides would be respectively identical in cross-section to the wave guides 11, 12 and 13, continuing the ridges 15, 16, 20 and 24 without discontinuity, if the coupling is made at a point where these ridges exist. To provide ample room for such flanges, the longitudinal axes of wave guides 11, 12 and 13, lie in parallel planes but the axis of wave guide 11 is separated from either of the others, by 90°. The axes of wave guides 12 and 13 are separated by 180°.

Central wave guide 12 has attached to each of its broad faces, mounting members 28 and 29, respectively. Apertures 31 and 32 extend respectively through each of the ridges 15 and 16 in wave guide 12, through the broad walls of wave guide 12, and through the mounting members 28 and 29. Apertures 31 and 32 are centered transversely of the wave guide 12. Seat inserts 33 and 34 are hollow cylindrical members lining the apertures 31 and 33, respectively, and are threadedly engaged with mounting members 28 and 29, respectively. Seat inserts 33 and 34 carry annular portions 35 and 36, respectively, in which are holes 37 and 38, respectively. Holes 37 and 38 are adapted to cooperate with a spanner wrench and facilitate insertion and removal of inserts 33 and 34.

Shaft 64 extends through wave guides 11, 12 and 13 and through apertures 31 and 32. Shaft 64 has a disc-like metallic shutter 30 fixed thereto between the adjacent ends of the seat inserts 33 and 34. Shutter 30 is preferably formed integrally with the shaft 30 for greater strength. The outer periphery of shutter 30 is beveled and conforms to beveled seats on the adjacent ends of seat inserts 33 and 34.

Integrally attached to the broad wall of wave guide 13 adjacent the wave guide 12 is a mounting member 40. Aperture 32 extends through mounting member 40 and through the broad wall of wave guide 13 to which it is secured. Similarly, a mounting member 41 is secured to the broad wall of wave guide 11 adjacent the wave guide 12. Aperture 31 extends through mounting member 41 and the broad wall of wave guide 11 to which it is secured.

Mounting members 28 and 41 conform to each other in shape and are adapted to be tightly secured together by bolts 42. Mounting members 28 and 41 are each provided with an annular relieved recess 44 and 45, respectively, surrounding and concentric with aperture 31 to provide a space for the annulus 15. An annular groove 46 and 47 is provided in mounting members 28 and 41, respectively, surrounding the recess 44—45 to provide a space for gasket 48 which is compressed by the action of bolts 42. A similar recess 52—53 and similar grooves 54—55 are provided in mounting members 40 and 29. Bolts 56 secure mounting members 40 and 29 together and compress gasket 58 in grooves 54—55. Gaskets 48 and 58 are provided to allow the wave guide assembly 10 to be pressurized, if that is desired.

Threaded apertures 61 and 62 are extended through the ridges 24 and 20 and the adjoining broad walls of wave guides 11 and 13 respectively. Shaft 64 extends through, and is concentric with, apertures 61 and 62, which are in alignment with apertures 31 and 32. Externally threaded spring-finger inserts 65 and 66 screw respectively in the apertures 61 and 62 in ridges 20 and 24. The end of inserts 65 and 66 extending inside wave guides 11 and 13 have provided thereon a series of spring fingers 67 and 68 respectively converging toward shaft 64 and making good electrical contact therewith. Bearing members 69 and 70, which are preferably made of oil-impregnated porous metal, fit inside the outer ends of inserts 65 and 66 respectively forming bearings in which shaft 64 slides. Bearing members 69 and 70 have outer flanges which are fastened respectively to wave guides 11 and 12 by screws 72 and 73. The ends of apertures 61 and 62 inside the wave guides 11 and 13 are provided with inwardly extending shoulders against which spring-finger inserts may be tightly screwed to insure good electrical contact. Wave guides 11, 12 and 13 are each terminated in a short circuit by a transverse conductive end wall.

A bracket member 75 is secured in a fixed position with respect to wave guide 11 by bolts 42. A solenoid 76 has a jacket 77 of a metal permeable to magnetic flux and having a threaded sleeve which extends through an aperture in bracket 75 and is secured thereto by nut 78. Solenoid 76 includes two separate windings 80 and 81 wound concentrically with the shaft 64 and placed one beside the other along their common axis. Within the solenoid 76 is a central core 82 connected through a shaft 83 and a shock absorbing and coupling device 84 to the shaft 64.

Device 84, shown in detail in FIG. 4, includes a cylindrical rubber shock absorbing member 85 having an axial hole therethrough. Spaced metal sleeves 86 and 87 line the hole at the ends thereof. They are spaced axially and are securely bonded to the rubber member 85. Sleeve 86 is secured to the shaft 83 by a pin 88 extending transversely through both elements. Sleeve 87 is secured to the female member 89 of coupling device 84 by a pin 90 which extends transversely through both of these elements. Surrounding shaft 64 and coaxial therewith is a male cylindrical member 91 which is threadably engaged within the female member 89. Male member 91 has an axial hole therethrough to receive one end of shaft 64 and has an internal relieved annular groove receiving a bushing 92 which is split longitudinally to form two separate semi-cylindrical parts. Shaft 64 has an annular groove in which the split bushing 92 fits. Bushing 92 is thicker than the depth of the annular groove in shaft 64 and when bushing 92 is in the groove in shaft 64, it provides a shoulder abutting a conforming shoulder formed by the relieved groove in male member 91. The upper end of shaft 64 abuts against the interior of female member 89. Set screws 93 and 94 prevent the parts 91 and 89 from unscrewing during use. An outer metal casing 95 is cup-shaped with a concentric hole in its closed end. Its open end screws over one end of the female member 89. Its other end tightly presses rubber ring 96 against one end of sleeve 86.

The shock absorbing and coupling member 84 above described is provided because of the necessity of having a positive coupling member which will not loosen in use and which can be readily disassembled for a replacement of worn parts in the wave guide assembly. Spring pins were found not suitable for this purpose because of the difficulty of removing them when this became necessary. Member 84 eliminates the need for pins in the shaft 64. The diameter of shaft 64 is set by the electrical characteristics of the coaxial lines 31—64 and 32—64. In small transmit-receive devices the shaft 64 would be greatly weakened by pins. With the coupling means shown, it is only necessary to loosen set screws 93 and 94 and unscrew the parts 89 and 91, both of which turn readily. Elements 89 and 91 readily pull apart when they are unscrewed and the split bushing 92 is easily slid out of the relieved groove in male member 91 and is separated to remove it from the annular groove in the shaft 64. The metal cup 95 is provided to limit the stress produced in the rubber member 85 which was found to have too short an operating life if it continuously took all of the pull in lifting the shaft 64.

As best seen in FIG. 5, the end of shaft 64 opposite the end terminating at the shock absorbing and coupling member 84 terminates in a coupling member 100. Coupling member 100 includes elements corresponding to elements 89, 91, 92, 93 and 94 of coupling and shock absorbing member 84 except that the member 101 of coupling 100, corresponding to female member 89 of coupling 84 has two opposite parallel V-section chord-like grooves near its outer extremity. Two leaf members 102 and 103, are each provided with a knife-edge at one end which bears upon one of the V-section grooves in the member 101. Leaves 102 and 103 extend substantially at right angles to the shaft 64 when shaft 64 is in its mid-position, and have recessed knife-edges at their outer ends which bear in V-section grooves in leaf-support members 104 and 105.

As best seen in FIG. 6, leaf-support members 104 and 105 are recessed along their sides adjacent to their V-section grooves to cooperate with the recessed ends of the leaves 102 and 103 in maintaining the parts in proper position. Leaf members 104 and 105 are pivotally mounted at either end of a base member 106 by pins 107 and 108. A tension spring 111 urges leaf supports 104 and 105 together. Spring 111 has one end thereof extending through a hole in one end of adjusting screw 112 which is threadably engaged with leaf support 104. The other end of spring 111 extends through a hole in one end of a headed member 113 which is freely rotatable in the member 105.

In the operation of the device above described, when the shaft 64 is in its upper position, the shutter 30 is tightly pressed against the seat of the insert 33. The wave guide 13 is connected to the wave guide 12 by the coaxial line consisting of the opening 32 and the lining thereof and the shaft 64 which provides the inner conductor. In this position wave guide 11 is completely isolated from the wave guide 12 since the conducting shutter 30 seals off the opening 31.

If now the solenoid winding 81 is energized, the core 82 is urged downwardly, but this is resisted by the leaves 102, 103 which exert an upward push through the coupling 100 upon the shaft 64. When the current through the solenoid winding 81 builds up to a sufficient amount, the pull downward of the core 82 will overcome the upward push exerted by the leaves 102—103. At this point, the shaft 64 moves rapidly downward and the shutter 30 shifts from its upper position against the seat of insert 33 to its lower position against the seat of insert 34. In this lower position wave guide 11 is connected with wave guide 12 and wave guide 13 is isolated therefrom. The resilient coupling 84 reduces the shock of impact between the shutter 30 and the seats of members 33 and 34. The spring fingers 67 and 68 make a good electrical contact with the shaft 64 and prevent leakage of radio energy out of the wave guides along the shaft 64.

FIG. 7 shows a system in which the transmit-receive device hereinabove described may be used. A timing pulse generator 115 delivers timing pulses to the delay and trigger circuit 116. Delay and trigger circuit 116 delivers a short positive pulse at the beginning of the timing pulse to gaseous triode 118 and a short positive pulse at the trailing edge of each timing pulse to the grid of gaseous triode 117. The cathode of gaseous triode 117 is connected to solenoid winding 81 and the cathode of gaseous triode 118 is connected to the solenoid winding 80. Delay and trigger circuit 116 also supplies to transmitter 120 a disabling pulse having a leading edge simultaneous with the leading edge of the timing pulse and having a trailing edge delayed by approximately the switching time after the trailing edge of the timing pulse. The output of transmitter 120 is connected to wave guide 11 of the transmit-receive device shown in FIGS. 1 and 5. An antenna, which may be a horn 121, is connected to wave guide 12. Wave guide 13 is connected to a receiver 122, the output of which is applied to a frequency indicator 123.

The construction of a specific circuit 116 to provide the necessary pulses will readily occur to those skilled in the art. The circuit might advantageously include a monostable multivibrator, tripped by the leading edge of the timing pulse to provide the pulse for disabling the transmitter. The pulses supplied to the grids of triodes 117 and 118 might be derived by differentiation circuits from the timing and transmitter-disabling pulses.

In the operation of the device shown in FIG. 7, the duration of the timing pulse shown in Plot A of FIG. 8 has a duration equal to the time, perhaps 20 milliseconds, that it is desired to have the receiver in operation and indicating the received frequency on the indicator 123. The timing pulse of Plot A might recur at a rate of once a second or at a random rate. The disabling pulse shown in B of FIG. 8, disables the transmitter 120 at a time simultaneous with the beginning of the timing pulse. At the same time, solenoid winding 80 is energized by action of the gaseous triode 118 as tripped by the positive pulse seen in Plot C. A short time after the beginning of the application of the positive pulse shown in Plot C to the solenoid 81, the receiver 122 is connected to the horn 121.

When the positive pulse of Plot D is applied to tube 117 energizing coil 81, the shutter begins to disconnect the receiver 122 from the horn 121. There is a finite time at this point when the receiver is coupled to some extent to the horn 121 and so is the transmitter 120. However, because of the extended duration of the transmitter-disabling pulse shown in Plot B of FIG. 7, the transmitter does not again operate until a short time after the application of the positive pulse in Plot D. This insures that when the transmitter begins to operate, the receiver 122 will be completely isolated from the central wave guide 12 and will not be injured by an application of a strong radio wave from transmitter 120.

The system and the transmit-receive device disclosed above is an advantageous one which permits the use of one antenna with a broadband transmitter and a receiver. The wave guide assembly associated with the transmit-receiver device can be disassembled to permit the replacement of worn parts and the operation of the transmitter is so timed that it will not injure the receiver during the switching operation.

It will be understood that the wave guides 11, 12 and 13 may be oriented in any position about the axis of the wave guide assembly 10 represented by the shaft 64. If the bolts 42 are placed at symmetrical positions of the mounting members 28, 29, 40 and 41, as at the four corners thereof, the wave guides 11, 12 and 13 may be readily assembled all in one direction or in any other combination of directions permitted by the bolt holes.

The transmit-receive device herein set forth has proven unusually advantageous in practice having a maximum VSWR of 1.35 and an average VSWR of 1.2 over a frequency range from 2460–5250 megacycles. The dimensions of this constructed transmit-receive device were as follows:

| | |
|---|---|
| Wave guides 11, 12 and 13 (inside) | 2.840 X 1.004 |
| Width—ridges 15, 16, 20 and 21 | .906 |
| Maximum height ridge 20 approx. at X—X | .737 |
| Maximum height ridges 15 and 16, not including steps 49 and 50, approximately at 2—2 | .341 |
| Width irises 21 and 22 | .750 |
| Width irises 17 and 18 | .500 |
| Thickness of irises 17, 18, 21 and 22 | .032 |
| Steps 49 and 50 | .032 |
| Distance from irises 21 and 22 to axis of shaft 64 | 1.425 |
| Distance from irises 17 and 18 to axis of shaft 64 | .955 |
| Vertical height of cones 67 and 68 | .240 |
| Shutter thickness | .130 |
| Shutter movement | .258 |
| Length of coaxial line between wave guides 12 and 13 (inside upper wall wave guide 13 to inside lower wall wave guide 12) | .778 |
| Distance from end ridges 15 and 16 to inside end wall of wave guide 12 | .125 |
| Dimension of notch 19 in direction of longitudinal axis of wave guide 13 | .545 |
| Dimension of notch 19 in a direction transversely of the longitudinal axis of wave guide 13 and parallel to the broad faces thereof | .200 |

Another transmit-receive device constructed in accordance with this invention had a maximum VSWR of 1.5 and an average VSWR of 1.25 over a frequency range of 5150–10,300; its dimensions were those given above divided by the scale factor 2.073.

It will be seen that a highly advantageous rotary joint would be provided by removing the bolts 42 to allow relative rotation between the wave guides of assembly 10. Means might be provided to maintain the parts in rotational relation and to prevent the leakage of energy between the adjacent rotating elements. In such a rotational joint it would be possible to also take advantage of the switching action if desired, or to only make use of two relatively rotating wave guides.

It will also be seen that wave guides 11 and 12 provide a particularly advantageous 90° bend substantially in the H-plane in a broadband wave guide structure.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A wave guide switching device including, first, second and third wave guides, said second wave guide being between said first and third wave guides, each of said wave guides being constructed as a separate unit, detachable means for holding said wave guides in juxtaposition, two aligned openings respectively coupling said second wave guide to said first and third wave guides, a shaft extending through said openings, shutter means fixed to said shaft within said second wave guide, and a seat-inserted for each of said openings detachably fixed to means integrally associated with said second wave guide, each seat-insert providing a seat for said shutter means.

2. The wave guide switching device of claim 1 in which there is provided means to move said shaft longitudinally of its axis so that the shutter moves from one seat to the other.

3. The switching device of claim 1 in which there is provided means to move said shaft longitudinally of its axis so that the shutter moves from one seat to the other, and overcenter spring means tending to urge said shutter toward its nearest seat.

4. The combination of claim 1 in which the longitudinal axes of said wave guides are respectively in planes separated by 90° and including the axes of said shaft.

5. The switching means of claim 1 in which said second wave guide has two opposed impedance matching ridges through which said openings extend.

6. The combination of claim 5 in which the outer wave guides each has an impedance matching ridge opposite the opening into the second wave guide and through which the shaft passes, resilient means for making electrical contact between each of said latter two ridges and said shaft.

7. A wave guide switching device, including first, second and third wave guides, said second wave guide being between said first and third wave guides, two aligned openings respectively coupling said second wave guide to said first and third wave guides, a shaft extending through said openings, a shutter means fixed to said shaft within said second wave guide, said openings providing seats for said shutter means, means to move said shaft longitudinally of its axis so that the shutter moves from one seat to the other, over-center spring means tending to urge said shutter toward its nearest seat, and in which the over-center spring means includes two opposed mechanical links pivotally associated with said shaft and resiliently urged toward said shaft, said links being substantially at right angles to the axis of said shaft when said shutter is in its mid-position.

8. A wave guide switching device, including first, second and third wave guides, said second wave guide being between said first and third wave guides, two aligned openings respectively coupling said second wave guide to said first and third wave guides, a shaft extending through said openings, a shutter means fixed to said shaft within said second wave guide, said openings providing seats for said shutter means, means to move said shaft longitudinally of its axis so that the shutter moves from one seat to the other, means for coupling said shaft to said moving means, said shaft being provided with an annular groove at the end thereof, said coupling including a split bushing fitting in said groove and including threadably engaged male and femal parts one of which abuts against the end of the shaft and the other of which abuts against the end of the bushing remote from said end of said shaft.

9. A transmit-receive device including first, second and third pipe-like wave guides of rectangular section each having two broad and two narrow side walls, said second wave guide being between said first and third wave guides with the broad walls of said second wave guide being adjacent broad walls of said first and third wave guides, each of said wave guides being constructed as a separate unit, detachable fastening means holding said second wave guide in fixed relation to said first and third wave guides, the opposing broad walls of said second wave guide having impedance matching ridges, first and second openings extending respectively through said ridges and the walls from which said ridges extend for coupling power between said second wave guide and said first and third wave guides, an impedance matching ridge on the broad side of each of the first and third wave guides, third and fourth openings extending respectively through said last mentioned ridges and the walls of the first and third wave guide from which they extend, all of said openings being aligned, a longitudinal movable shaft extending through said openings, shutter means fixed to said shaft and adapted to close either of said first and second openings.

10. The transmit-receive device of claim 9 in which a mounting member is secured to each of the broad walls of the second wave guide and to each of the broad walls of first and third wave guides that are adjacent the second wave guide, bolt-means for fastening together the adjacent mounting members, said first and second openings respectively extending through adjacent pairs of mounting members.

11. The transmit-receive device of claim 10 in which there is provided a seat-insert threadably engaged with each of said mounting members secured to said second wave guide, each of said seat-inserts extending through its adjacent ridge in said second wave guide and providing a seat for said shutter means.

12. A transmit-receive device including first, second and third pipe-like wave guides of rectangular section each having two broad and two narrow side walls, said second wave guide being between said first and third wave guides with the broad walls of said second wave guide being adjacent broad walls of said first and third wave guides, each of said wave guides being constructed as a separate unit, a mounting member secured to each of the two broad walls of the second wave guide and to the broad walls of the first and third wave guides adjacent the second wave guide, detachable means for holding together the adjacent mounting members, the opposing broad walls of said second wave guide having impedance matching ridges, first and second openings extending respectively through said ridges, the adjacent wave guide walls and mounting members for coupling power between said second wave guide and said first and third wave guides, an impedance matching ridge on the broad side of each of the first and third wave guides, third and fourth openings extending respectively through said last mentioned ridges and the walls of the first and third wave guide from which they extend, all of said openings being aligned, a longitudinal movable shaft extending through said openings, shutter means fixed to said shaft and adapted to close either of said first and second openings, means for longitudinally moving said shaft mounted on the subassembly comprising a first wave guide and the mounting means attached thereto and resilient means to urge said shaft longitudinally to cause said shutter means to close the opening to which it is most adjacent, said resilient means being mounted on the sub-assembly comprising the third wave guide and the mounting member secured thereto.

13. The combination of claim 12 in which said shaft includes a resilient shock-absorbing means between said moving means and said shutter.

14. The combination of claim 12 in which said moving means includes two solenoids and a solenoid core associated with said shaft.

15. The combination of claim 12 in which said resilient means includes a plurality of mechanical links pivotally associated with said shaft, said links being resiliently urged toward said shaft and being at approximately right angles thereto when said shaft is in its mid-position longitudinally.

16. The combination of claim 12 in which a spring-finger insert is provided in said third and fourth openings, one end of each spring-finger insert extending through its associated ridge and terminating in a plurality of spring fingers making good electrical contact with said shaft, the other end of each cylinder member being provided with shaft-bearing means for fastening it to the wall of its associated wave guide most remote from the wave guide.

17. The combination of claim 12 in which iris-matching means are provided in each of said first, second and third wave guides.

18. In combination, a source of timing pulses each having a duration corresponding to a desired look-through period, said pulses being supplied to a delay and trigger circuit which provides at a first output a short trigger pulse synchronized with the leading edge of each timing pulse, at a second output a short trigger pulse synchronized with the trailing edge of each timing pulse and at a third output a transmitter-disabling pulse having a leading edge synchronized with the leading edge of each timing pulse, first, second and third conduits for transmitting therethrough electromagnetic waves, a mechanical switching means for connecting said second conduit alternatively with the first, and third conduits, first electrical means operating said switching means to connect said first and second conduits, second electrical means operating said switching means to connect said second and third conduits, a receiver connected to said first conduit, radiating means connected to said second conduit, a transmitter having disabling means connected to the third conduit, means connecting said first output to said first electric means, means connecting said second output to said second electric means, means connecting said third output to said disabling means, said switching means requiring a finite switching period for the operation of disconnecting said second conduit from one of the other two conduits and connecting it to the remaining of said conduits, said transmitter-disabling pulse having a duration exceeding said look-through period by approximately the switching period.

References Cited in the file of this patent
UNITED STATES PATENTS

| | | |
|---|---|---|
| 2,235,010 | Chaffee | Mar. 18, 1941 |
| 2,535,266 | Chance | Dec. 26, 1950 |